United States Patent
Zelesky et al.

(10) Patent No.: US 10,731,855 B2
(45) Date of Patent: Aug. 4, 2020

(54) COMBUSTOR PANEL COOLING ARRANGEMENTS

(71) Applicant: United Technologies Corporation, Farmington, CT (US)

(72) Inventors: Mark F. Zelesky, Bolton, CT (US); Carey Clum, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 265 days.

(21) Appl. No.: 15/683,965

(22) Filed: Aug. 23, 2017

(65) Prior Publication Data

US 2019/0063749 A1    Feb. 28, 2019

(51) Int. Cl.
| F23R 3/00 | (2006.01) |
| F23R 3/06 | (2006.01) |
| F23R 3/26 | (2006.01) |
| F02C 7/12 | (2006.01) |

(52) U.S. Cl.
CPC .............. F23R 3/002 (2013.01); F02C 7/12 (2013.01); F23R 3/06 (2013.01); F23R 3/26 (2013.01); *F23R 2900/03042* (2013.01)

(58) Field of Classification Search
CPC .... F23R 3/002; F23R 3/04; F23R 3/06; F23R 2900/030401; F23R 2900/03042; F23R 2900/030404; F23M 9/04
See application file for complete search history.

(56) References Cited

U.S. PATENT DOCUMENTS

| 5,216,886 A | 6/1993 | Ewing |
| 9,057,523 B2 | 6/2015 | Cunha et al. |
| 2014/0090402 A1* | 4/2014 | Erbas-Sen ................. F23R 3/04 60/806 |
| 2015/0354821 A1 | 12/2015 | Cunha |
| 2016/0069569 A1 | 3/2016 | Burd |
| 2016/0238253 A1* | 8/2016 | Moura ...................... F23R 3/50 |
| 2017/0059162 A1 | 3/2017 | Papple et al. |
| 2018/0031238 A1* | 2/2018 | Harding .................. F23R 3/002 |

FOREIGN PATENT DOCUMENTS

| CN | 101526228 A | 9/2009 |
| EP | 0471438 A1 | 2/1992 |
| EP | 1363075 A2 | 11/2003 |

OTHER PUBLICATIONS

European Search Report for European Application No. 18190592.8, International Filing Date Aug. 23, 2018, dated Jan. 22, 2019, 7 pages.

* cited by examiner

*Primary Examiner* — Todd E Manahan
*Assistant Examiner* — David P. Olynick
(74) *Attorney, Agent, or Firm* — Cantor Colburn LLP (57) ABSTRACT

Combustors and panels for use in combustor sections of gas turbine engines, the panels having a panel body having a first wall with a first sidewall and a second sidewall extending each extending from the first wall in the same direction at edges of the first wall and a plurality of cavity walls arranged between the first sidewall and the second sidewall and extending from the panel in the direction of the first and second sidewalls, wherein a plurality of cooling cavities are defined by the cavity walls, the first wall, and at least one of the first sidewall and the second sidewall, wherein each cooling cavity extends from an inlet hole to an outlet hole, wherein the outlet hole is formed in the first wall.

17 Claims, 7 Drawing Sheets

COMBUSTOR PANEL COOLING ARRANGEMENTS

BACKGROUND

The subject matter disclosed herein generally relates to panels for combustors in gas turbine engines and, more particularly, to bosses and cooling arrangements for combustor panels within gas turbine engines.

A combustor of a gas turbine engine may be configured and required to burn fuel in a minimum volume. Such configurations may place substantial heat load on the structure of the combustor (e.g., panels, shell, etc.). Such heat loads may dictate that special consideration is given to structures which may be configured as heat shields or panels configured to protect the walls of the combustor, with the heat shields being air cooled. Even with such configurations, excess temperatures at various locations may occur leading to oxidation, cracking, and high thermal stresses of the heat shields or panels. As such, impingement and convective cooling of panels of the combustor wall may be used. Convective cooling may be achieved by air that is trapped between the panels and a shell of the combustor. Impingement cooling may be a process of directing relatively cool air from a location exterior to the combustor toward a back or underside of the panels.

Thus, combustor liners and heat shields are utilized to face the hot products of combustion within a combustion chamber and protect the overall combustor shell. The combustor liners are supplied with cooling air including dilution passages which deliver a high volume of cooling air into a hot flow path. Dilution passages include a boss which extends beyond a hot side face of the liner. Other features in the combustor may have liners with bosses. It may be difficult to cool the bosses, and thus combustor liner boss cooling may be advantageous.

SUMMARY

According to some embodiments, combustor panels for use in gas turbine engine combustor sections are provided. The combustor panels include a panel body having a first wall with a first sidewall and a second sidewall extending each extending from the first wall in the same direction at edges of the first wall and a plurality of cavity walls arranged between the first sidewall and the second sidewall and extending from the panel in the direction of the first and second sidewalls, wherein a plurality of cooling cavities are defined by the cavity walls, the first wall, and at least one of the first sidewall and the second sidewall. Each cooling cavity extends from an inlet hole to an outlet hole, wherein the outlet hole is formed in the first wall.

In addition to one or more of the features described above, or as an alternative, further embodiments of the combustor panels may include that the inlet hole is closer to one of the first sidewall and the second sidewall and the outlet is closer to the other of the first sidewall and the second side.

In addition to one or more of the features described above, or as an alternative, further embodiments of the combustor panels may include that the inlet hole is an impingement hole and the outlet hole is an effusion hole.

In addition to one or more of the features described above, or as an alternative, further embodiments of the combustor panels may include that an inlet end of at least one cooling cavity includes a single inlet hole and an outlet end of the of the at least one cooling cavity includes a plurality of outlet holes.

In addition to one or more of the features described above, or as an alternative, further embodiments of the combustor panels may include that at least one cooling cavity includes one or more augmentation features arranged to control a cooling flow passing through the at least one cooling cavity.

In addition to one or more of the features described above, or as an alternative, further embodiments of the combustor panels may include that the first and second sidewalls are configured to fixedly attach to a combustor shell.

In addition to one or more of the features described above, or as an alternative, further embodiments of the combustor panels may include that the first sidewall is an exterior wall of the combustor panel and the second sidewall is interior sidewall that defines a panel aperture.

In addition to one or more of the features described above, or as an alternative, further embodiments of the combustor panels may include that the outlet holes include first outlet holes arranged adjacent to the first sidewall and second outlet holes arranged adjacent the second sidewall, and wherein the first wall is a solid body between the first outlet holes and the second outlet holes.

In addition to one or more of the features described above, or as an alternative, further embodiments of the combustor panels may include a second wall extending from at least one of the first sidewall and the second sidewall and defining a wall of the cooling cavities such that the cooling cavities are defined between the cavity walls, the first wall, at least one of the first sidewall and the second sidewall, and the second wall.

In addition to one or more of the features described above, or as an alternative, further embodiments of the combustor panels may include that the second wall is configured to fixedly attach to a combustor shell.

In addition to one or more of the features described above, or as an alternative, further embodiments of the combustor panels may include that the second wall varies in thickness such that at least one cooling cavity tapers in a direction from the inlet hole to the outlet hole.

In addition to one or more of the features described above, or as an alternative, further embodiments of the combustor panels may include that the second wall separates at least one cooling cavity into a first portion and a second portion, wherein the first portion and the second portion of the cooling cavity are fluidly connected by a turn structure.

In addition to one or more of the features described above, or as an alternative, further embodiments of the combustor panels may include that one or more particle discouragers are arranged on the second wall within the first portion of the cooling cavity.

In addition to one or more of the features described above, or as an alternative, further embodiments of the combustor panels may include a third wall extending from at least one of the first sidewall and the second sidewall and defining a wall of the cooling cavities such that the cooling cavities are defined between the cavity walls, the first wall, at least one of the first sidewall and the second sidewall, the second wall, and the third wall.

In addition to one or more of the features described above, or as an alternative, further embodiments of the combustor panels may include that the third wall and the second wall define a first portion of at least one cooling cavity and the second wall and the first wall define a second portion of the at least one cooling cavity.

According to some embodiments, combustors of gas turbine engines are provided. The combustors include a combustor shell defining a support structure and at least one combustor panel mounted to the support structure. The at least one combustor panel includes a panel body having a first wall with a first sidewall and a second sidewall extending each extending from the first wall in the same direction at edges of the first wall and a plurality of cavity walls arranged between the first sidewall and the second sidewall and extending from the panel in the direction of the first and second sidewalls, wherein a plurality of cooling cavities are defined by the cavity walls, the first wall, and at least one of the first sidewall and the second sidewall. Each cooling cavity extends from an inlet hole to an outlet hole, wherein the outlet hole is formed in the first wall.

In addition to one or more of the features described above, or as an alternative, further embodiments of the combustors may include that the plurality of cooling cavities are defined by the cavity walls, the first wall, at least one of the first sidewall and the second sidewall, and the support structure.

In addition to one or more of the features described above, or as an alternative, further embodiments of the combustors may include that the inlet holes are impingement holes in the combustor shell.

In addition to one or more of the features described above, or as an alternative, further embodiments of the combustors may include that the first sidewall is an exterior wall of the combustor panel and the second sidewall is interior sidewall that defines a panel aperture, wherein the combustor further includes a fuel injector that is installed within the panel aperture.

In addition to one or more of the features described above, or as an alternative, further embodiments of the combustors may include a second wall extending from at least one of the first sidewall and the second sidewall and defining a wall of the cooling cavities such that the cooling cavities are defined between the cavity walls, the first wall, at least one of the first sidewall and the second sidewall, and the second wall, wherein the second wall is fixedly attached to the support structure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1:
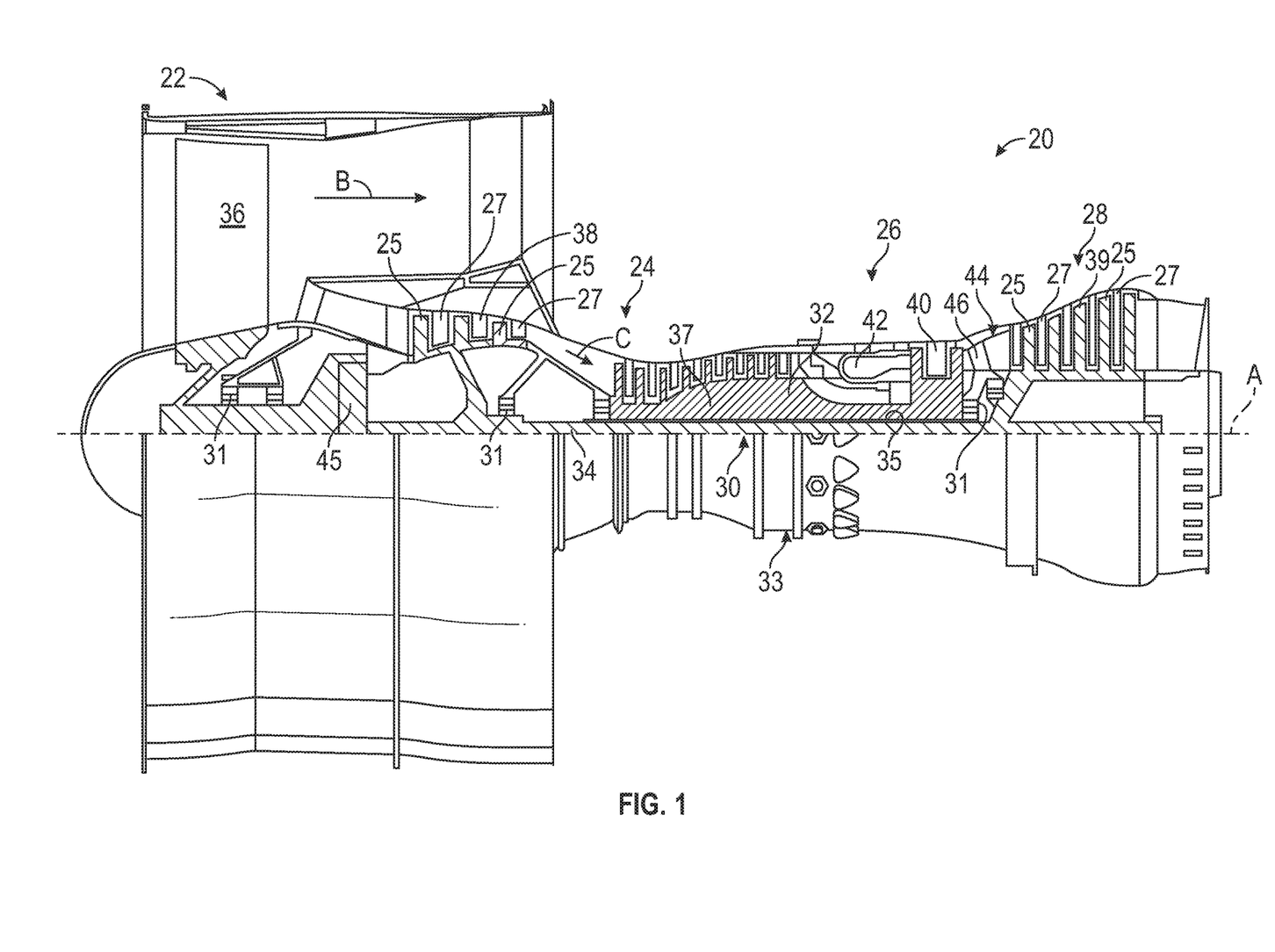
FIG. 1 is a schematic cross-sectional illustration of a gas turbine engine that may employ various embodiments disclosed herein.

FIG. 1 schematically illustrates a gas turbine engine 20. The gas turbine engine 20, as shown, is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, single-spool, three-spool, etc. engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meter). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(T_{ram} °R)/(518.7° R)]^{0.5}$, where $T_{ram}$ represents the ambient temperature in degrees Rankine. The Low Corrected Fan Tip Speed according to one non-limiting embodiment of the example gas turbine engine 20 is less than about 1150 feet per second (fps) (351 meters per second (m/s)).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 2A:
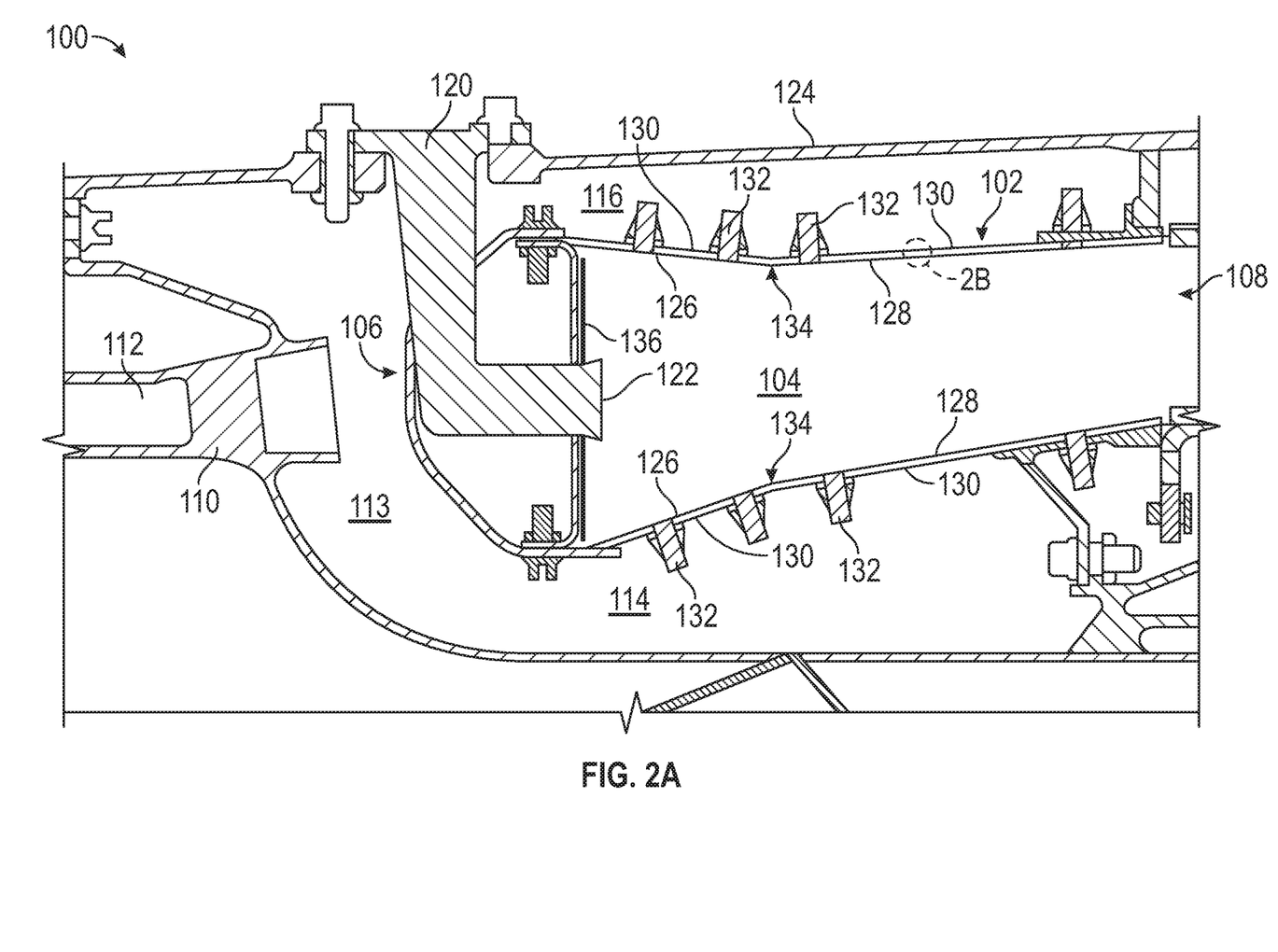
FIG. 2A is a schematic illustration of a combustor section of a gas turbine engine that may employ various embodiments disclosed herein.
Figure 2B:
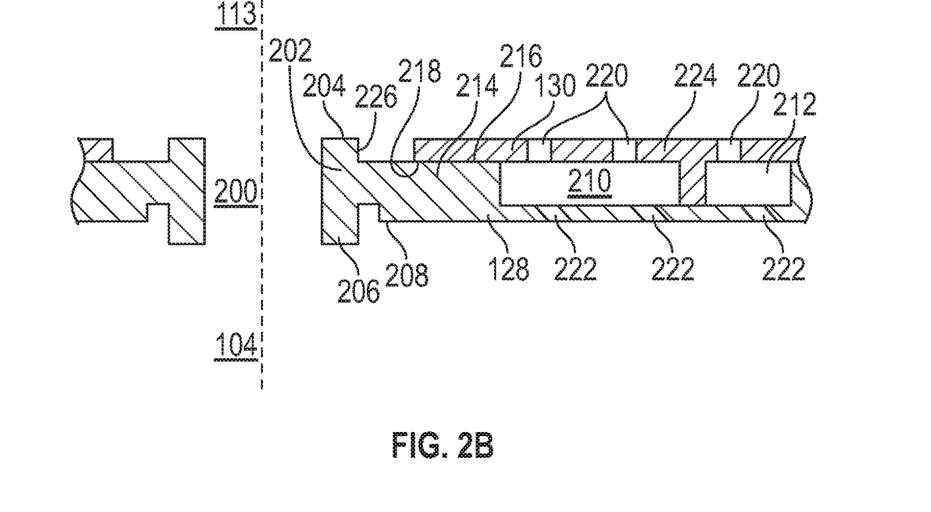
FIG. 2B is a schematic illustration of a cross-section of a combustor liner of the combustor section of FIG. 2A.

FIG. 2A is a schematic illustration of a configuration of a combustion section 100 of a gas turbine engine that can incorporate embodiments of the present disclosure. FIG. 2B is an enlarged illustration of a portion of the combustion section 100 as indicated in FIG. 2A. As shown, a combustor 102 defines a combustion chamber 104. The combustor 102 includes an inlet 106 and an outlet 108 through which air may pass. The air may be supplied to the combustor 102 by a pre-diffuser 110.

In the configuration shown in FIG. 2A, air is supplied from a compressor into an exit guide vane 112, as will be appreciated by those of skill in the art. The exit guide vane 112 is configured to direct the airflow into the pre-diffuser 110, which then directs the airflow toward the combustor 102. The combustor 102 and the pre-diffuser 110 are separated by a shroud chamber 113 that contains the combustor 102 and includes an inner diameter branch 114 and an outer diameter branch 116. As air enters the shroud chamber 113 a portion of the air may flow into the combustor inlet 106, a portion may flow into the inner diameter branch 114, and a portion may flow into the outer diameter branch 116. The air from the inner diameter branch 114 and the outer diameter branch 116 may then enter the combustion chamber 104 by means of one or more nozzles, holes, apertures, etc. The air may then exit the combustion chamber 104 through the combustor outlet 108. At the same time, fuel may be supplied into the combustion chamber 104 from a fuel injector 120 and a pilot nozzle 122, which may be ignited within the combustion chamber 104. The combustor 102 of the engine combustion section 100 may be housed within a shroud case 124 which may define the shroud chamber 113.

The combustor 102, as shown in FIG. 2A, includes multiple panels 126, 128 that are mounted on an interior surface of one or more shells 130 and are arranged parallel to the shells 130. The shells 130 can define circular or annular structures with the panels 126, 128 being mounted on an inner diameter shell and an outer diameter shell, as will be appreciated by those of skill in the art. The panels 126, 128 can be removably mounted to the shell 130 by one or more attachment mechanisms 132. In some embodiments, the attachment mechanism 132 may be integrally formed with a respective panel 126, 128, although other configurations are possible. In some embodiments, the attachment mechanism 132 may be a bolt or other structure that may extend from the respective panel 126, 128 through the interior surface to a receiving portion or aperture of the shell 130 such that the panel 126, 128 may be attached to the shell 130 and held in place.

The panels 126, 128 include a plurality of cooling holes and/or apertures to enable fluid, such as gases, to flow from areas external to the combustion chamber 104 into the combustion chamber 104. Impingement cooling may be provided from the shell-side of the panels 126, 128, with hot gases may be in contact with the combustion-side of the panels 126, 128. That is, hot gases may be in contact with a surface of the panels 126, 128 that is facing the combustion chamber 104.

First panels 126 may be configured about the inlet 106 of the combustor 102 and may be referred to as forward panels. Second panels 128 may be positioned axially rearward and adjacent the first panels 126, and may be referred to as aft panels. The first panels 126 and the second panels 128 are configured with a gap 134 formed between axially adjacent first panels 126 and second panels 128. The gap 134 may be a circumferentially extending gap that extends about a circumference of the combustor 102. A plurality of first panels 126 and second panels 128 may be attached and extend about an inner diameter of the combustor 102, and a separate plurality of first and second panels 126, 128 may be attached and extend about an outer diameter of the combustor 102, as known in the art. As such, axially extending gaps may be formed between two circumferentially adjacent first panels 126 and between two circumferentially adjacent second panels 128.

Further, a bulkhead 136 is shown located at a forward end of the combustion chamber 104. The bulkhead 136 surrounds and supports the pilot nozzle 122. The bulkhead 136 can include a portion of the shell 130 to support a panel thereon, as will be appreciated by those of skill in the art.

Turning now to FIG. 2B, an enlarged schematic illustration of a portion of the shell 130 and the second panel 128 mounted thereto is shown. The enlarged portion of FIG. 2A is indicated in the dashed circle labeled 2B. Although an enlarged portion of second panel 128 is shown, the present description can be applied to any of the panels that are part of the combustion section 100, including first panels 126 and/or panels of the bulkhead 136.

As shown in FIG. 2B, a dilution passage 200 has a boss 202 extending between a boss outer end 204 and a boss inner end 206. The dilution passage 200 is an aperture or through-hole that passes through both the shell 130 and the second panel 128 and is arranged to allow for dilution air into the combustion chamber 104, as will be appreciated by those of skill in the art. The second panel 128 has an inner face 208 facing the hot products of combustion in the combustion chamber 104.

Cooling cavities 210, 212 are provided spaced from a sealing area 214 which has an upper contact surface 216 which is spaced inwardly from the boss outer end 204. The cooling cavities 210, 212 are spaced from the sealing area 214 in a direction away from the boss 202. As can be seen, the upper contact surface 216 seals against an inner surface 218 of the shell 130. Such contact of the contact surfaces 216, 218 seals the cooling cavities 210, 212 from the shroud chamber 113. Air is injected into cooling cavities 210, 212 through impingement holes 220 and then through panel holes 222 (e.g., effusion holes) in the second panel 128 to provide film cooling along the inner face 208 of the second panel 128. Further, in some embodiments, and as shown in FIG. 2B, ribs 224 can separate the cavities 210, 212.

The second panel 128 (and/or first panel 126 and/or a panel of the bulkhead 136) can include large apertures (e.g., dilution passage 200 or other through-holes) to accommodate flow addition (e.g., for cooling and/or mixing in the combustion chamber 104), to enable mounting, and/or for mating to other hardware (e.g., mounting to ignitors, fuel nozzles, etc.). For example, in some embodiments, a fuel nozzle may be inserted into and/or through a large aperture. These apertures are often manufactured with bosses (e.g., boss 202) surrounding the aperture to enable sealing or facilitate manufacturability. The additional mass created by these bosses (e.g., at sealing area 214) create areas that can be difficult to cool by traditional means. Furthermore, in regions where these bosses come in close proximity to other features (e.g., rails, ribs, grommets, bosses, etc.), the area between the multiple features may become conjoined to facilitate manufacturing (e.g. casting) and thus may have a relatively large material thickness. Accordingly, challenges in the placement of local cooling can be created and such arrangements can lead to elevated part temperatures. The high temperatures can shorten part life.

Figure 3A:
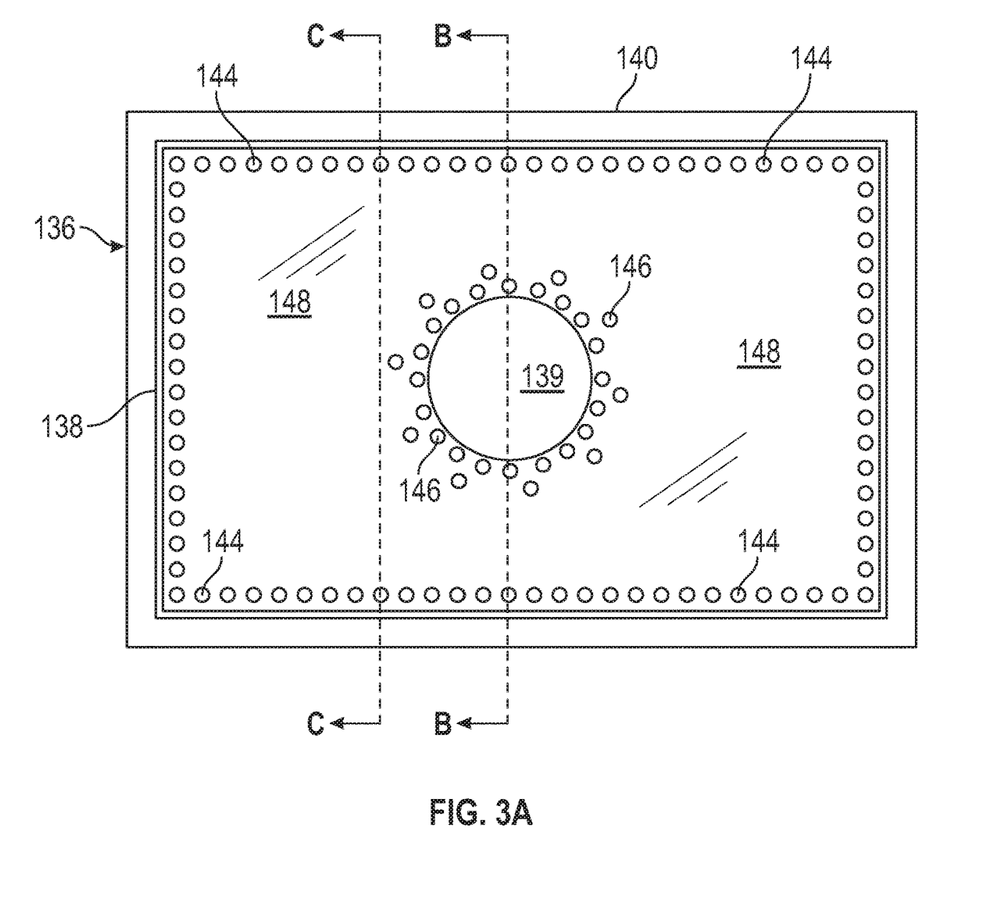
FIG. 3A is a schematic illustration of a combustor panel that can implement embodiments of the present disclosure.
Figure 3B:
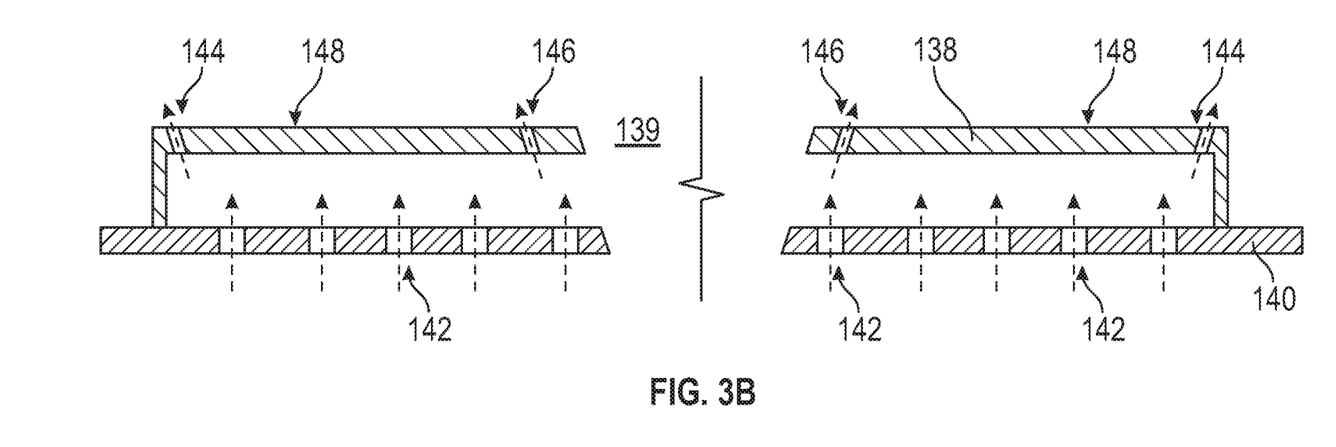
FIG. 3B is a schematic cross-sectional illustration of the combustor panel of FIG. 3A as viewed along the line B-B in FIG. 3A.
Figure 3C:
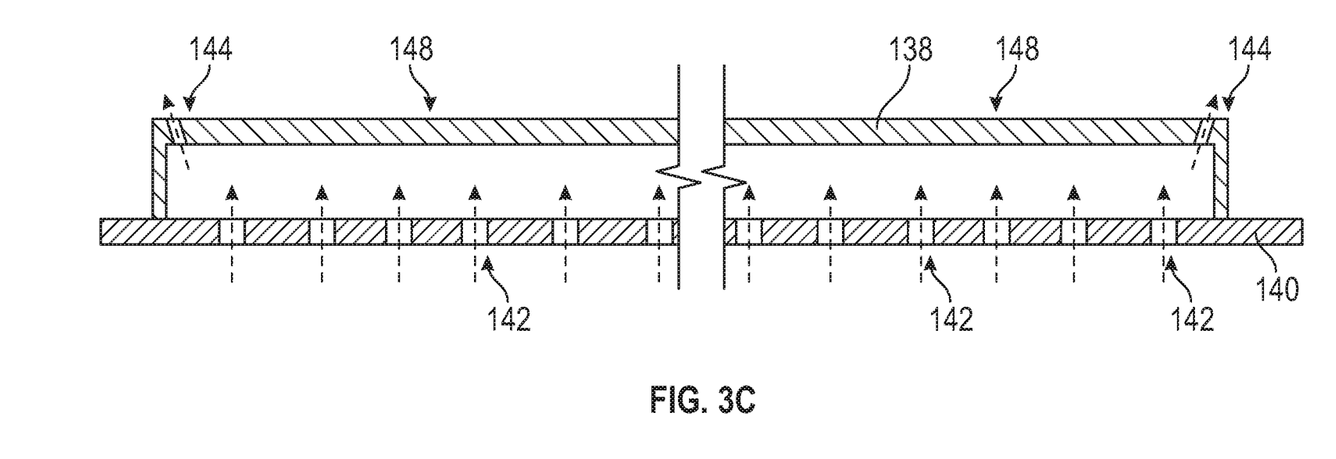
FIG. 3C is a schematic cross-sectional illustration of the combustor panel of FIG. 3A as viewed along the line C-C in FIG. 3A.

Turning now to FIGS. 3A-3C, schematic illustrations of a bulkhead 136 are shown. FIG. 3A is a plan view looking at a bulkhead panel 138 of the bulkhead 136 (e.g., from within the combustion chamber), FIG. 3B is a cross-sectional illustration as viewed along the line B-B and FIG. 3C is a cross-sectional illustration as viewed along the line C-C. The bulkhead panel 138 is located on a hot-side such that the bulkhead panel 138 faces a combustion chamber, with a panel aperture 139 formed therein. In some arrangements, a pilot nozzle or other structure can be inserted into and/or through the panel aperture 139. The bulkhead panel 138 is mounted to a bulkhead shell 140. FIGS. 3A-3C represent an impingement cooled bulkhead. That is, the bulkhead panel 138 is cooled by cool air that is passed through the bulkhead shell 140 (e.g., from the shroud chamber 113 shown in FIG. 2A). The impingement cooling is achieved through a plurality of impingement holes 142 that are formed within the bulkhead shell 140, as shown in FIGS. 3B-3C. The impinging air then flows into and along an inside surface of the bulkhead panel 138, and then exits into the combustion chamber through first effusion holes 144 located at a periphery of the bulkhead panel 138 and second effusion holes 146 located around and proximate to the panel aperture 139.

The bulkhead panel 138 has a panel body 148 that is solid (e.g., no holes or apertures) in the space between the first and second effusion holes 144, 146. The panel body 148 provides various properties to the combustion section of the engine, such as enabling relighting characteristics for a pilot nozzle that extends through the bulkhead panel 138.

The bulkhead panel 138 is effusion cooled or backside impingement cooled with cooling air flowing through the impingement holes 142, the air cross flows along the panel body 148 between bulkhead panel 138 and the bulkhead shell 140, e.g., enters the impingement holes 142 and exits out the effusion holes 144. The portion of airflow along the panel body 148 may be an area of low velocity, which can form stagnation areas. Due to the stagnation and/or low velocity airflow, dirt can accumulate in such areas between the impingement holes 142 and the effusion holes 144, 146. As such, the arrangement shown in FIGS. 3A-3C may be prone to dirt build-up or fouling and backside convection degradation due to the dirt build-up between the bulkhead panel 138 and the bulkhead shell 140. Built-up dirt can cause fouling of the backside of the bulkhead panel 138 that in turn can insulate portions of the bulkhead panel 138 from the impingement cooling provided through the impingement holes 142. Accordingly, it may be advantageous to improve cooling arrangements of bulkhead panels and/or other combustor panels (e.g., panels 126, 128, as shown in FIG. 2).

Figure 4A:
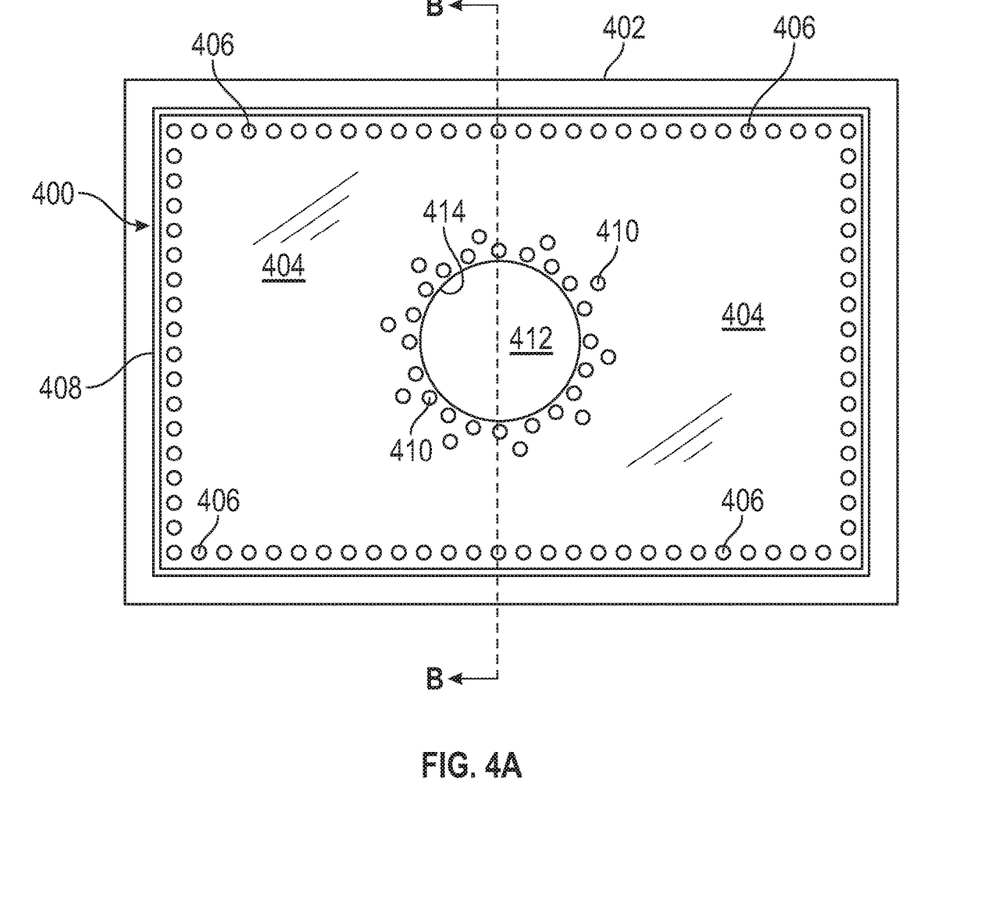
FIG. 4A is a schematic illustration of a combustor panel in accordance with an embodiment of the present disclosure.
Figure 4B:
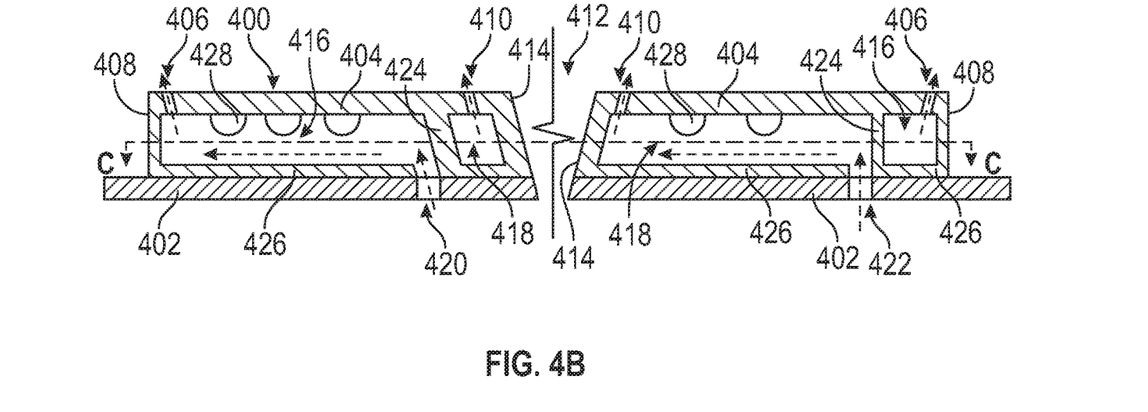
FIG. 4B is a schematic cross-sectional illustration of the combustor panel of FIG. 4A as viewed along the line B-B in FIG. 4A.
Figure 4C:
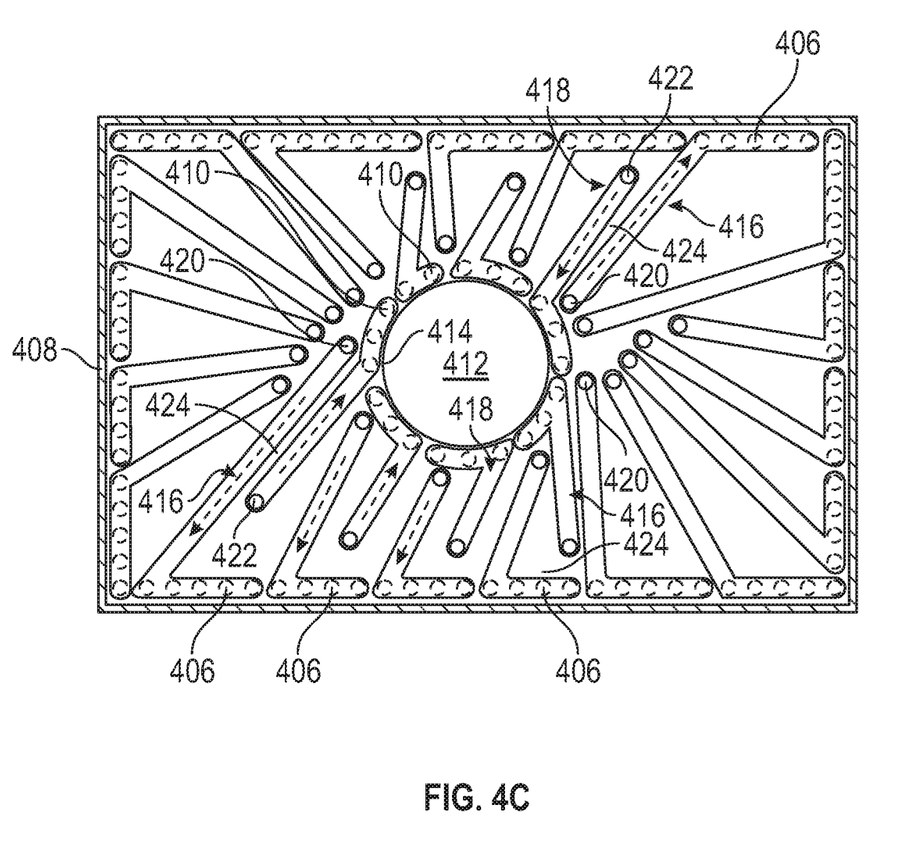
FIG. 4C is a schematic cross-sectional illustration of the combustor panel of FIGS. 4A-4B as viewed along the line C-C in FIG. 4B.

Turning now to FIGS. 4A-4C, schematic illustrations of a panel 400 in accordance with an embodiment of the present disclosure is shown. The panel 400 may be used as a bulkhead panel, a combustor liner panel, or other panel in a gas turbine engine, and particularly, for example, in combustion sections of gas turbine engines. FIG. 4A is a top-down, plan view illustration of the panel 400, FIG. 4B is a cross-sectional illustration of the panel 400 as viewed along the line B-B shown in FIG. 4A, and FIG. 4C is a top-down, plan view illustration of the panel 400 as viewed along the line C-C shown in FIG. 4B illustrating an interior structure of the panel 400. As shown, the panel 400 is mounted to or otherwise fixed or attached to a support structure 402, such as a combustion chamber shell, as shown and described above.

The panel 400 includes a first wall 404 having first outlet holes 406 (e.g., effusion holes) passing through a portion of the first wall 404 and positioned about or adjacent a first sidewall 408 of the panel 400. In this embodiment, the first sidewall 408 is an exterior wall or side of the panel 400. The first wall 404 may be a hot wall or surface that is exposed to hot gases, such as within a combustion chamber of a gas turbine engine. In accordance with embodiments of the present disclosure, the first wall 404 is raised or separated from the support structure 402 by a length or height of the first sidewall 408, e.g., in a direction extending from the support structure 402 (as shown in FIG. 4B). Further, second outlet holes 410 (e.g., effusion holes) are formed passing through a portion of the first wall 404 and positioned about a panel aperture 412. As shown, second sidewalls 414 may define a portion or wall of the panel aperture 412. The first and second sidewalls 408, 414 extend from the first wall in the same direction (e.g., toward the support structure as shown in FIG. 4B). The first wall 404 is a solid body or solid surface in areas between the first and second outlet holes 406, 410 (e.g., no holes in the first wall 404 except at the periphery or edge and around the panel aperture).

As will be appreciated by a comparison between FIG. 4A and FIG. 3A, the pattern of first and second outlet holes of the two embodiments are substantially similar. That is, in accordance with some embodiments of the present disclosure, and as shown in the embodiment of FIGS. 4A-4C, the outlet-hole pattern may not change even when features described herein are incorporated into a panel or a panel is made or formed as described herein.

In accordance with embodiments of the present disclosure, and as shown in FIGS. 4A-4C, the panel 400 includes a pattern of cooling cavities 416, 418. The cooling cavities 416, 418 are arranged within the panel 400 and define fluid passages within the panel 400 to enable improved cooling to the panel 400. The each of the cooling cavities 416, 418 is a cooling passage that extends from one or more inlet holes 420, 422 (e.g., impingement holes) to one or more outlet holes 406, 410 (e.g., effusion holes). For example, first cooling cavities 416 are arranged to fluidly connect one or more first inlet holes 420 with one or more first outlet holes 406. As illustrated in FIGS. 4B-4C, the first inlet holes 420 are located proximate the panel aperture 412 and formed in the support structure 402. The first inlet holes 420 form inlets into the first cooling cavities 416, with the cooling or impinging air flowing along and through the respective first cooling cavity 416 from an interior portion of the panel 400 toward the external sidewall 408 (and an exterior portion of the panel 400). Similarly, the second inlet holes 422 form inlets into the second cooling cavities 418, with the cooling or impinging air flowing along and through the respective second cooling cavity 418 from an exterior portion of the panel 400 toward the second sidewall 414 (and the interior portion of the panel 400). The cooling cavities 416, 418 have the outlet holes 406, 410 as outlets. That is, first outlet holes 406 form outlets to the first cooling cavities 416 and second outlet holes 410 form outlets to the second cooling cavities 418.

Adjacent cooling cavities 416, 418 are fluidly separated by cavity walls 424 that extend from the first wall 404 toward the support structure 402. In some embodiments, the first sidewall 408, second sidewall 414, and cavity walls 424 can sealing engage with or attach to the support structure 402 (e.g., by soldering, additive manufacturing, brazing, etc.). Further, in some embodiments, the first sidewall 408, second sidewall 414, and cavity walls 424 may be integrally formed with the first wall 404 of the panel 400.

As shown in FIG. 4B, the panel 400 includes an optional second wall 426. The second wall 426 can be a cold wall or wall of the panel 400 that is away from hot gases of a combustion chamber. The second wall 426, in this embodiment, can define part of the cooling cavities 416, 418. In some embodiments, the second wall 426 can aid in installation of the panel 400 to the support structure 402. In some embodiments, the second wall 426 of the panel 400 can either be tight-fit against the support structure 402 or can be offset with a gap existing between the second wall 426 and the support structure 402.

As shown, the inlet holes 420, 422 pass through the second wall 426 and, as will be appreciated by those of skill in the art, the holes in the second wall 426 align with the holes in the support structure 402 to form the inlet holes 420, 422. Although the holes are in the second wall 424 and the support structure 402 are aligned, it is not required that the hole sizes match, and in some non-limiting embodiments, the holes formed in the support structure 402 may be larger in diameter than the holes formed in the second wall 426.

The cooling cavities 416, 418 can have a geometric shape within the panel 400 to enable a desired flow through the respective cooling cavities 416, 418. As shown in the embodiment of FIGS. 4A-4C, each cooling cavity 416, 418 has a single inlet hole 420, 422 at an inlet end of the respective cavity and is fluidly connected to multiple outlet holes 406, 410 at an outlet end of the respective cavity. Further, the spacing between the first wall 404 and the support structure 402 (or second wall 426) can vary to achieve desired flow rates through the cooling cavities 416, 418. Furthermore, the number of inlet holes (inlet holes 420, 422) and outlet holes (outlet holes 406, 410) can be adjusted to achieve desired flow rates through the cooling cavities 416, 418.

Also shown in FIG. 4B, the cooling cavities 416, 418 can include one or more augmentation features 428 that are shaped to minimize dirt build-up, augment cooling of the first wall 404, control cooling flow through the cooling cavities 416, 418, and/or direct flow to the outlet holes (outlet holes 406, 410). The arrangement of the augmentation features 428 and the geometry, shape, length, etc. of the cooling cavities 416, 418 can be arranged to achieve high velocity cooing flow such that the shear forces do not allow fine dirt to adhere to the inside of the first wall 404. The augmentation features 428 may be, without limitation, trip strips, ribs, pedestals, bumps, ridges, etc.

Figure 5:
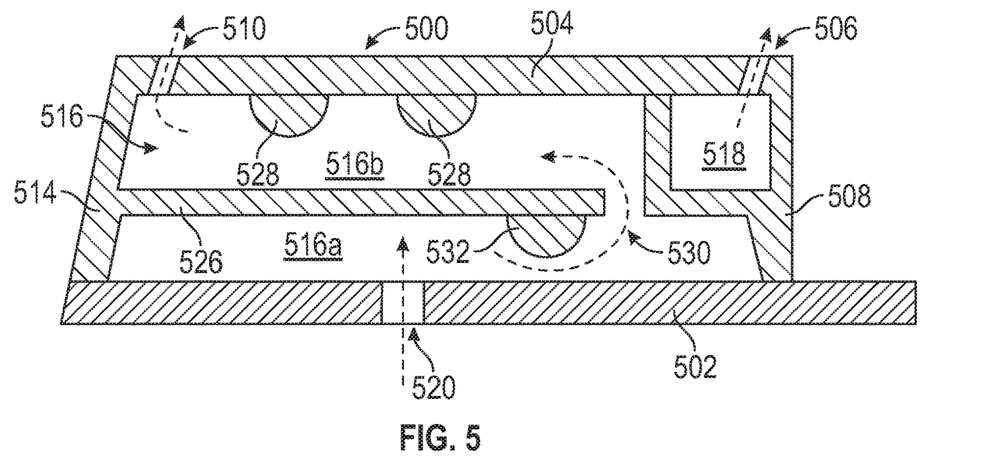
FIG. 5 is a partial cross-sectional schematic illustration of a combustor panel in accordance with an embodiment of the present disclosure.

Turning now to FIG. 5, a partial illustration of another embodiment of the present disclosure is shown. FIG. 5 illustrates a side, cross-sectional illustration of a panel 500 as attached to a support structure 502, similar to the cross-sectional view shown in FIG. 4B. The panel 500 includes a first wall 504 and a second wall 526. The first and second walls 504, 526 extend between, at least partially, a first sidewall 508 and a second sidewall 514. The second sidewall 514 can define a panel aperture as shown and described above. In this embodiment, a cooling cavity 516 is separated into a first portion 516a and a second portion 516b, with the two portions 516a, 516b divided by the second wall 526. Further, the first portion 516a is fluidly connected to the second portion 516b by a turn structure 530. The turn structure 530 can be formed of a slot, multiple holes or apertures, or take other shape, geometry, etc. that enables fluid connection between the first portion 516a and the second portion 516b of the cooling cavity 516. As shown, the first portion 516a is fed by an inlet hole 520 through the support structure 502. The cooling air then flows from the first portion 516a through the turn structure 530 and into the second portion 516b. The airflow within the second portion 516b can be controlled or impacted by one or more augmentation features 528 and then exit or outlet through an outlet hole 510.

As shown in FIG. 5, the first portion 516a can include one or more particle discouragers 532. The particle discouragers 532 are shapes, sized, and positioned to prevent particles (e.g., dirt) from flowing from the first portion 516a (e.g., cold portion) into the second portion 516b (e.g., hot portion). Thus, the particles will be prevented from building up within the second portion 516b of the cooling cavity 516.

The panel 500 includes a number of first cooling cavities 516 and a number of second cooling cavities 518, with a portion of a second cooling cavity 518 shown in FIG. 5. Similar to the embodiments described above, the first cooling cavities 516 are arranged to fluidly connect one or more inlet holes 520 with one or more first outlet holes 506. In contrast to the embodiment described above, the inlet holes 520 are not located proximate edges of the panel 500, rather, the inlet holes 520 may be offset from one or both of the first outlet hole 510 (e.g., cavity outlet) and the turn structure 530. In other embodiments, the inlet holes (inlet) in the support structure can be aligned with the turn structure or the outlet holes (outlet). When not aligned, as shown in FIG. 5, the offset can focus or direct any particles on the backside of the second wall 526 prior to entering the second portion 516b.

As shown in FIG. 5, the sidewalls 508, 514 form the features that engage with or contact the support structure 502. Further, although not shown, the cooling cavities 516, 518 are defined between cavity walls that fluidly separate adjacent cooling cavities and between the first and second sidewalls 508, 514.

Figure 6:
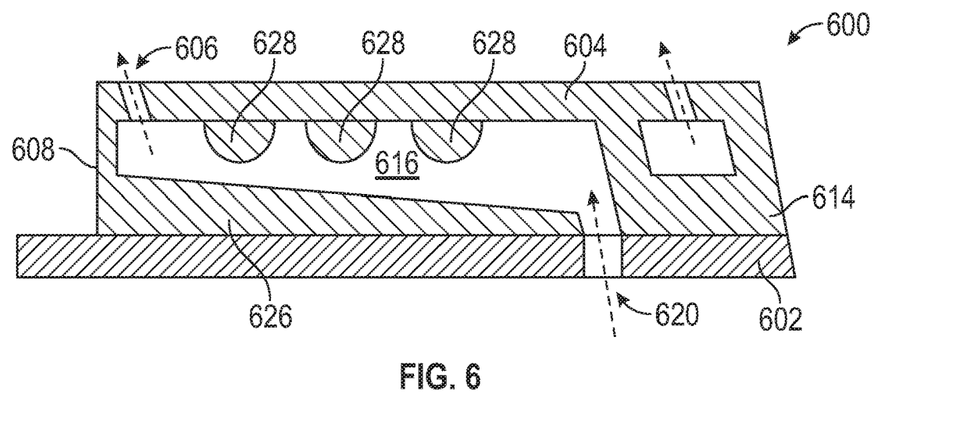
FIG. 6 is a partial cross-sectional schematic illustration of a combustor panel in accordance with an embodiment of the present disclosure.

Turning now to FIG. 6, a partial illustration of another embodiment of the present disclosure is shown. FIG. 6 illustrates a side, cross-sectional illustration of a panel 600 as attached to a support structure 602, similar to the cross-sectional view shown in FIG. 4B. The panel 600 includes a first wall 604 and a second wall 626. The first and second walls 604, 626 extend between, at least partially, a first sidewall 608 and a second sidewall 614. The second sidewall 614 can define a panel aperture as shown and described above. In this embodiment, a cooling cavity 616 is tapered in a direction from an inlet at an inlet hole 620 toward an outlet at an outlet hole 606. The airflow within the cooling cavity 616 can be controlled or impacted by one or more augmentation features 628 prior to exiting or outletting through the outlet hole 606.

As noted, the cooling cavity 616 is tapered from an inlet to an outlet. The tapering is achieved through a variable thickness second wall 626. That is, the thickness of the second wall 626 increases from the inlet of the cooling cavity 616 (e.g., inlet hole 620) to the outlet of the cooling cavity 616 (e.g., outlet hole 606). The increased thickness of the second wall 626 can provide rigidity and/or structural support to the panel 600. Further, in some arrangements, the increased thickness of the second wall 626 can enable improved securing of the panel 600 of the support structure 602. A thickness profile of the second wall 626 can be selected to achieve desired mounting characteristics and/or desired flow characteristic within the cooling cavity 616.

Figure 7:
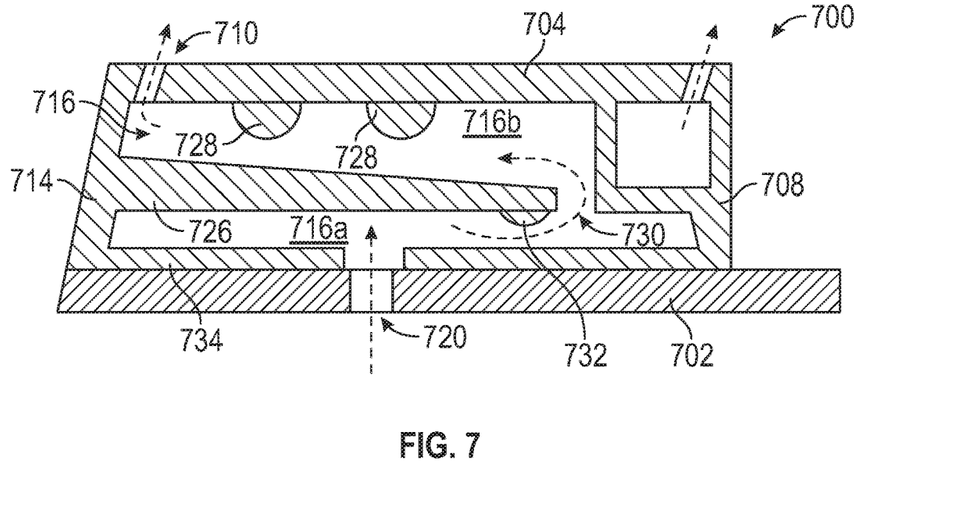
FIG. 7 is a partial cross-sectional schematic illustration of a combustor panel in accordance with an embodiment of the present disclosure.

Turning now to FIG. 7, a partial illustration of another embodiment of the present disclosure is shown. FIG. 7 illustrates a side, cross-sectional illustration of a panel 700 as attached to a support structure 702, similar to the cross-sectional view shown in FIG. 4B. The panel 700 includes a first wall 704, a second wall 726, and a third wall 734. This embodiment is a combination of features shown in FIGS. 5-6, including a tapered second wall 726 that is separated from the support structure 702 and includes and defines a turn structure 730 between a first portion 716a and a second portion 716b of a cooling cavity 716. The first, second, and third walls 704, 726, 734 extend between, at least partially, a first sidewall 708 and a second sidewall 714. The second sidewall 714 can define a panel aperture as shown and described above. In this embodiment, the second portion 716a of the cooling cavity 716 is tapered from an inlet at the turning structure 730 toward an outlet at an outlet hole 710. Cooling airflow enters the cooling cavity 716 through an inlet hole 720 (e.g., in the third wall 734 and the support structure 702). The airflow within the second portion 716b of the cooling cavity 716 can be controlled or impacted by one or more augmentation features 728 prior to exiting or outletting through the outlet hole 710. Further, the first portion 716a can include one or more particle discouragers 732, as described above with respect to FIG. 5.

The above described embodiments and illustrations associated therewith are provided for illustrative and explanatory purposes and are not to be limiting. Various features of the embodiments can be combined and/or modified or additional features may be added without departing from the scope of the present disclosure. In some embodiments of the present disclosure, the panels can be single-piece cast structures with the cooling cavities formed therein. In other embodiments, a unitary or solid structure of the panels (with internal cooling cavities) can be manufactured using additive manufacturing techniques, etching, machining, etc. In some embodiments, the various walls may be separately made and then assembled as shown and described.

In some embodiments, the first portion of the cooling cavity (e.g., first portions 516a, 716a) may not have cavity side walls and thus may be a large, open cavity that is fed by inlet holes and the air flowing through the turn structures into the various second portions (e.g., second portions 516b, 716b). In other embodiments, the first portion of the cooling cavity can be divided up or separated into various geometric patterns using cavity walls to aid in direction of cooling flow through the cooling cavities.

Although described herein with respect to a bulkhead panel having a central panel aperture, embodiments described herein can be applied to any type of panel. For example, when referring to the illustrations of FIGS. 5-7, the first sidewall (e.g., 508) and the interior sidewall (e.g., 514) can be two exterior sidewalls of the panel, with the cavities extending from one side to the other. In other embodiments, the panel aperture may be a dilution hole for injecting air into a combustion chamber. That is, embodiments provided herein may be configured in various types of panels without departing from the scope of the present disclosure.

Although various embodiments are shown and described herein, those of skill in the art will appreciate that variations thereon are possible without departing from the scope of the present disclosure. For example, various combinations of the features of the example embodiments described herein may be combined or features may be omitted therefrom. Further, as schematically shown in various embodiments of the present disclosure, the through-holes, grooves, apertures, cooling holes, etc. can be angled or otherwise geometrically arranged to achieve a desired cooling flow in and on the combustor components.

Advantageously, in accordance with non-limiting embodiments, a combustor for a gas turbine engine includes a combustor panel having internal cooling cavities to provide improved cooling and dirt separation (e.g., prevention of dirt build-up behind a hot surface of the panel). Advantageously, embodiments described herein can provide higher cooling effectiveness for a given amount of cooling air, improved structural integrity due to a two-wall structure protecting the support structure (e.g., shell) from burn through, and/or improved dirt tolerance and less fouling due to dirt build-up on a backside of a hot surface of the panel.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A combustor panel for use in a gas turbine engine combustor section, the combustor panel comprising:
   a panel body having a first wall with a first sidewall and a second sidewall each extending from the first wall in the same direction at respective edges of the first wall; and
   a plurality of cavity walls arranged between the first sidewall and the second sidewall and extending from the panel body in the direction of the first and second sidewalls, wherein a plurality of cooling cavities are defined by the cavity walls, the first wall, and at least one of the first sidewall and the second sidewall,
   a second wall extending from at least one of the first sidewall and the second sidewall, parallel to the first wall, and defining a wall of the cooling cavities such that the cooling cavities are defined between the cavity walls, the first wall, at least one of the first sidewall and the second sidewall, and the second wall,
   wherein each cooling cavity extends from an inlet hole to an outlet hole, wherein the outlet hole is formed in the first wall,
   wherein each cooling cavity of the plurality of cooling cavities is fluidly separate from each other cooling cavity of the plurality of cooling cavities, within the panel body, and
   wherein a first cooling cavity of the plurality of cooling cavities defines a flow path in a direction from the first sidewall to the second sidewall and a second cooling cavity of the plurality of cooling cavities defines a flow path in a direction from the second sidewall to the first sidewall.

2. The combustor panel of claim 1, wherein the inlet hole is closer to one of the first sidewall and the second sidewall and the outlet is closer to the other of the first sidewall and the second sidewall.

3. The combustor panel of claim 1, wherein the inlet hole is an impingement hole and the outlet hole is an effusion hole.

4. The combustor panel of claim 1, wherein an inlet end of at least one cooling cavity includes a single inlet hole and an outlet end of the of the at least one cooling cavity includes a plurality of outlet holes.

5. The combustor panel of claim 1, wherein at least one cooling cavity includes one or more augmentation features arranged to control a cooling flow passing through the at least one cooling cavity.

6. The combustor panel of claim 1, wherein the first and second sidewalls are configured to fixedly attach to a combustor shell.

7. The combustor panel of claim 1, wherein the first sidewall is an exterior wall of the combustor panel and the second sidewall is interior sidewall that defines a panel aperture.

8. The combustor panel of claim 7, wherein the outlet holes include first outlet holes arranged adjacent to the first sidewall and second outlet holes arranged adjacent the second sidewall, and wherein the first wall is a solid body between the first outlet holes and the second outlet holes.

9. The combustor panel of claim 1, wherein the second wall is configured to fixedly attach to a combustor shell.

10. The combustor panel of claim 1, wherein the second wall varies in thickness such that at least one cooling cavity tapers in a direction from the inlet hole to the outlet hole.

11. The combustor panel of claim 1, wherein the second wall separates at least one cooling cavity into a first portion and a second portion, wherein the first portion and the second portion of the cooling cavity are fluidly connected by a turn structure.

12. The combustor panel of claim 11, wherein one or more particle discouragers are arranged on the second wall within the first portion of the cooling cavity.

13. The combustor panel of claim 1, further comprising a third wall extending from at least one of the first sidewall and the second sidewall and defining a wall of the cooling cavities such that the cooling cavities are defined between the cavity walls, the first wall, at least one of the first sidewall and the second sidewall, the second wall, and the third wall.

14. The combustor panel of claim 13, wherein the third wall and the second wall define a first portion of at least one cooling cavity and the second wall and the first wall define a second portion of the at least one cooling cavity.

15. A combustor of a gas turbine engine, the combustor comprising:
   a combustor shell defining a support structure; and
   at least one combustor panel mounted to the support structure, the at least one combustor panel comprising:
   a panel body having a first wall with a first sidewall and a second sidewall each extending from the first wall in the same direction at respective edges of the first wall; and
   a plurality of cavity walls arranged between the first sidewall and the second sidewall and extending from the panel body in the direction of the first and second sidewalls, wherein a plurality of cooling cavities are defined by the cavity walls, the first wall, and at least one of the first sidewall and the second sidewall,
   a second wall extending from at least one of the first sidewall and the second sidewall, parallel to the first wall, and defining a wall of the cooling cavities such that the cooling cavities are defined between the cavity walls, the first wall, at least one of the first sidewall and the second sidewall, and the second wall,
   wherein each cooling cavity extends from an inlet hole to an outlet hole, wherein the outlet hole is formed in the first wall, wherein each cooling cavity of the plurality of cooling cavities is fluidly separate from each other cooling cavity of the plurality of cooling cavities, within the panel body, and wherein a first cooling cavity of the plurality of cooling cavities defines a flow path in a direction from the first sidewall to the second sidewall and a second cooling cavity of the plurality of cooling cavities defines a flow path in a direction from the second sidewall to the first sidewall.

16. The combustor of claim 15, wherein the inlet holes are impingement holes in the combustor shell.

17. The combustor of claim 15, wherein the first sidewall is an exterior wall of the combustor panel and the second sidewall is interior sidewall that defines a panel aperture, wherein the combustor further includes a fuel injector that is installed within the panel aperture.

* * * * *